(12) United States Patent
Andersson et al.

(10) Patent No.: US 7,085,608 B2
(45) Date of Patent: Aug. 1, 2006

(54) PLANT FOR CONTROLLING PROCESS EQUIPMENT

(75) Inventors: Björn Andersson, Västerås (SE); Henrik Ryegård, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/854,682

(22) Filed: May 27, 2004

(65) Prior Publication Data

US 2004/0220683 A1 Nov. 4, 2004

Related U.S. Application Data

(63) Continuation of application No. 09/701,036, filed as application No. PCT/SE99/00907 on May 27, 1999, now abandoned.

(30) Foreign Application Priority Data

May 27, 1998 (SE) .................................. 9801863

(51) Int. Cl.
G05B 11/01 (2006.01)
(52) U.S. Cl. ...................... 700/17; 700/169; 707/104.1
(58) Field of Classification Search .................... 700/9, 700/17, 19, 86, 87, 169; 709/200; 726/16; 707/104.1
See application file for complete search history.

(56) References Cited

U.S. PATENT DOCUMENTS

| 4,935,863 | A |   | 6/1990  | Calvas et al.     |         |
|-----------|---|---|---------|-------------------|---------|
| 5,136,222 | A | * | 8/1992  | Yamamoto et al.   | 318/568.2 |
| 5,522,043 | A |   | 5/1996  | Fukunaga          |         |
| 5,757,648 | A | * | 5/1998  | Nakamura          | 700/169 |
| 5,832,264 | A | * | 11/1998 | Hart et al.       | 719/316 |
| 5,914,876 | A | * | 6/1999  | Hirai             | 700/87  |
| 5,920,867 | A | * | 7/1999  | Van Huben et al.  | 707/101 |
| 5,963,450 | A | * | 10/1999 | Dew               | 700/169 |
| 6,209,048 | B1 |  | 3/2001  | Wolff             |         |
| 6,438,444 | B1 | * | 8/2002  | Mizuno et al.     | 700/169 |
| 6,473,656 | B1 | * | 10/2002 | Langels et al.    | 700/17  |

FOREIGN PATENT DOCUMENTS

| DE | 3823 102 A1    | 1/1990  |
| DE | 44 11 426 A1   | 10/1994 |
| DE | 197 04 694 A1  | 8/1997  |
| DE | 196 24 929 A1  | 1/1998  |
| DE | 196 32 609 A1  | 2/1998  |
| EP | 0 413 044 A1   | 2/1991  |

OTHER PUBLICATIONS

Happacher, Meinrad, "Nich aufzuhalten: Steuerungstechnik im Sog der PC-Technologie." ELEKTRONIK 16/1996, pp. 40-47.

* cited by examiner

Primary Examiner—Jungwon Chang
(74) Attorney, Agent, or Firm—Buchanan Ingersoll PC

(57) ABSTRACT

In a plant for controlling an equipment (4) adapted to carry out a process a superior arrangement (1) exists and has a first interface (2) to a programming unit (3) and a second interface (5) between the process equipment (4) and the arrangement. The arrangement has members (6) for transmitting information between the two interfaces. A memory member (9) adapted to store important data required for describing and defining the process of the process equipment is arranged in the process equipment itself. The arrangement (1) is provided with a rule data base (8) and a text data base (7) containing a configuration file for communication between the process equipment and the arrangement through the second interface by utilising a general process application protocol and a text file, respectively, adapted to the format of said data in the memory member of the process equipment.

11 Claims, 1 Drawing Sheet

PLANT FOR CONTROLLING PROCESS EQUIPMENT

CROSS-REFERENCE TO RELATED APPLICATIONS

This application is a continuation of application Ser. No. 09/701,036 filed Feb. 22, 2001, now abandoned, which is based upon International application no. PCT/SE99/00907, filed May 27, 1998.

FIELD OF THE INVENTION AND PRIOR ART

The present invention relates to a plant for controlling an equipment adapted to carry out a process, said plant comprising an arrangement superior to the process equipment and having a first interface to a programming unit adapted for entering commands to the process equipment for setting control parameters for the process and a second interface to the process equipment, members in the arrangement for transmitting information between the two interfaces and by that between the programming unit and the process equipment, a memory member adapted to store important data required for describing and defining the process of the process equipment as well as means adapted to enable access to said data through the programming unit so as to enable a determination of said commands based upon said data.

Such a plant may be used for controlling all types of process equipments, but for illuminating but not in any way restricting the invention and the problem set therefor a process equipment in the form of a welding apparatus of a welding robot will be described hereinafter.

It is in practise mostly so that the programming unit is seldom used for entering commands to the process equipment for said setting, and this is more exactly usually done only when installing the process equipment, and this is after that controlled according to the control parameters initially set by operating a start and a stop button by an operator. However, in some cases, when welding objects with different demands on welding seams, manufactured of different materials and the like, a plurality of said control parameters, such as the feeding speed of the welding wire, the gas mixture composition and the gas supply velocity could be set again when changes are done.

Said superior arrangement is usually called master system, and in plants of the type defined in the introduction already known said memory member, which stores data important for describing and defining the process of the process equipment, is arranged in the superior arrangement. Thus, it is the superior arrangement, which in these plants has the detail knowledge about the parameters of the process equipment, the format of each parameter and within which limits it may be set and so on. If the process equipment is exchanged in such a plant, so that the new process equipment has a somewhat different set of parameters and these are formated in a different way all detail knowledge about this process equipment has also to be stored in the superior arrangement, so that the entire system will be hardcoded, especially if it is desired to "speak" to many different types of process equipments.

Furthermore, in the plant of this type already known computers have been arranged at each process equipment, at the same time as there has been a programming unit connected to the superior arrangement, and it is necessary for an operator to go between the different computers and the programming unit for getting the entirety together for a desired control of the process, which is comparatively long-winded.

SUMMARY OF THE INVENTION

The object of the present invention is to provide a plant of the type defined in the introduction, which to a large extent finds a remedy to the inconveniences mentioned above of such plants already known.

This object is according to the invention obtained by arranging the memory member of such a plant in the very process equipment, by providing the superior arrangement with a rule data base and a text data base including a configuration file for communication between the process equipment and the arrangement through the second interface by utilising a general process application protocol and a text file, respectively, adapted to the format of said data in the memory member of the process equipment, and by the fact that the rule data base and the text data base are connected to said transmitting member and adapted to enable interpreting of data sent from the process equipment according to said application protocol by the transmitting member and transmitting thereof therethrough to the programming unit.

Thus, the invention is mainly based on the idea that it is the surrounding equipment itself which has the detail knowledge about the process and this is not exported in another way than temporarily into the rule data base. Thus, the superior arrangement does not have to know anything at all about the process of the process equipment in another way than through a text file and a configuration file associated with the process equipment, and if for example the process equipment has to be changed it will only be necessary to enter these files to the text data base and the rule data base, respectively, of the superior arrangement, so that data sent from the process equipment may be interpreted and be sent on through the transmitting member to the programming unit of the superior arrangement, which may by this be utilised by the process equipment.

Thanks to the fact that the superior equipment in this way does not know anything about the process equipment in another way than through a standardised rule data base, it will be possible to deliver the description of said second interface to many different deliverers of process equipments and these may describe their parameters and their couplings between parameters and scale factors and the like in the rule data base, so that in practise any process equipment may be driven together with the superior arrangement. Thus, it will be possible to use the same second interface to control process equipments for many different processes.

According to another preferred embodiment of the invention said rule data base and text data base are adapted to receive said configuration file and text file, which are specific for the process equipment in question, by entering thereof to these data bases through a data storing medium at an initial installation connection of the process equipment to the superior arrangement. By entering said configuration file and text file designed for communication between the process equipment and the superior arrangement through said application protocol to the rule data base and the text data base of the superior arrangement the control parameters of the process equipment may then be set through the programming unit of the superior arrangement, although all detail knowledge about the process in question remains only in the process equipment. The superior arrangement may in this way smoothly be coordinated with new process equipments of various types.

According to another preferred embodiment of the invention the plant comprises a plurality of process equipments connected to a superior arrangement in common through a second interface. It will not be any problem to utilise one single superior arrangement for controlling a plurality of process equipments, which all get access to the programming unit of the superior arrangement, since only a text file and a configuration file belonging to each process equipment have to be fed into the text data base and the rule data base, respectively, of the superior arrangement and all other information with respect to the control parameters of the different process equipments may be kept down in the process equipment.

According to another preferred embodiment of the invention, which constitutes a further development of the embodiment last mentioned, the process equipments are of at least two different types, and the rule data base and the text data base include a particular configuration file and text file for each type of process equipment, through which the advantages mentioned above of using one single superior arrangement without any demand on detail knowledge about the process equipment are obtained.

According to another preferred embodiment of the invention the superior arrangement also comprises a process control member connected to the transmitting member for bidirectional communication therewith so as to obtain controlling of the process to be carried out by the process equipment. This process control member is intended to control the very process after for example pressing a start button, and the parameters according to which the process control member does this may be set by utilising said programming unit and for example by moving a robot arm into different positions for welding and store the co-ordinates of these positions when installing the plant or adoption thereof to new process conditions.

According to another preferred embodiment of the invention the transmitting member is adapted to send information received from the process equipment about particular events, such as faults in the process, to a member also included in the superior arrangement and adapted to note and indicate such events. Information about events of the process equipment may by this be stored and visualised in the superior arrangement for analysis by the operator or later evaluation.

Further advantages as well as advantageous features of the invention appear from the following description and the other dependent claims.

BRIEF DESCRIPTION OF THE DRAWING

With reference to the appended drawing, below follows a specific description of a preferred embodiment of the invention cited as an example.

In the drawing.

DETAILED DESCRIPTION OF A PREFERRED EMBODIMENT OF THE INVENTION

Figure 1:
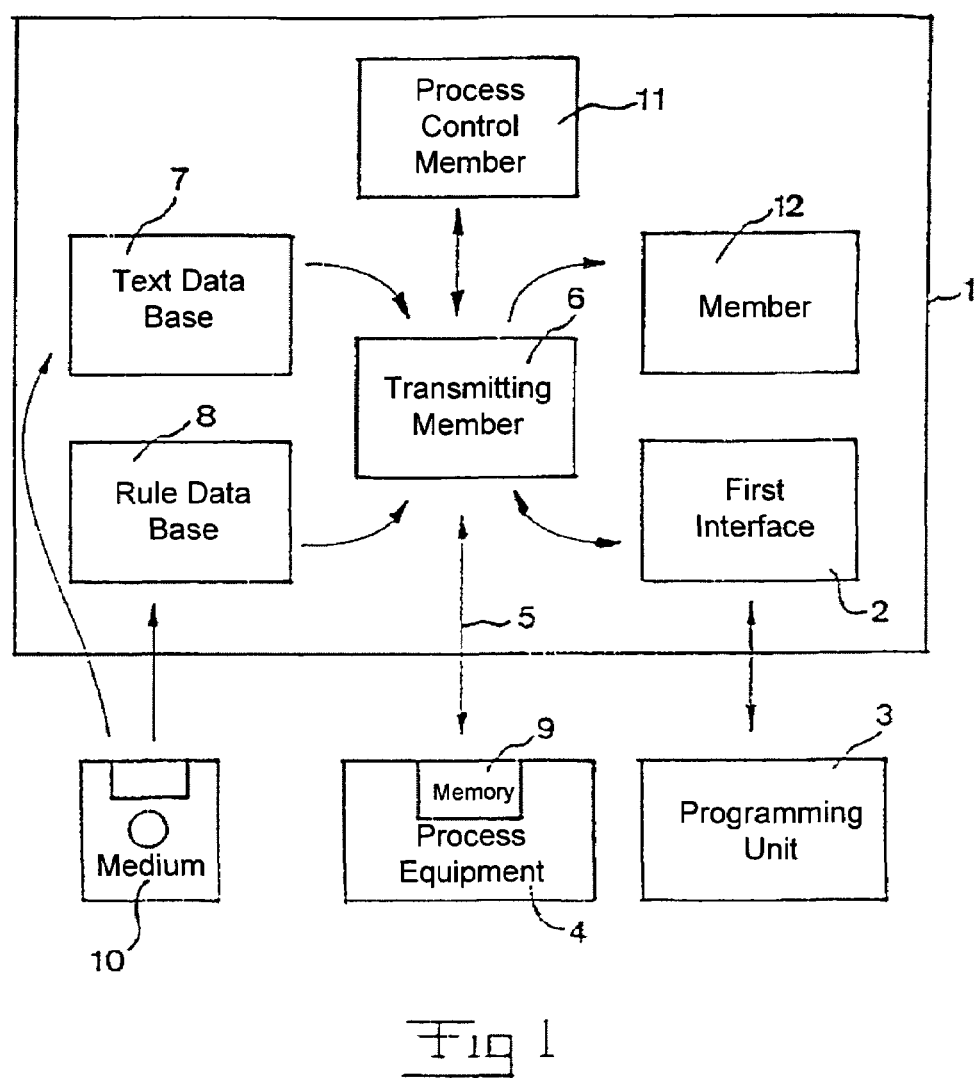
FIG. 1 is a schematic block diagram illustrating the general construction of a plant according to the invention.

A plant for controlling an equipment adapted to carry out a process according to a preferred embodiment of the invention is very schematically illustrated in FIG. 1 in the form of boxes, and this will hereinafter be explained in the case of a robot for welding, but the process equipment could of course be of any other type. The plant has a superior arrangement 1, which in every day speech is used to be called the master system of the robot, which has a first interface 2 between machine and man, a so called MMI=Man Machine Interface, to a programming unit 3, which is adapted for entering commands to a process equipment for setting control parameters for the process. This process equipment is illustrated at 4 and is in the present case a welding equipment for a welding robot. The superior arrangement 1 has a second interface to the process equipment 4 indicated by a double arrow 5.

There is also a member 6, a so called message interpreter, in the superior arrangement for transmitting information between the two interfaces 2, 5 and by that between the programming unit and the process equipment. For being able to understand the data sent from the processing equipment to the message interpreter 6 and for presenting this in an understandable way to an operator of the programming unit 3 the superior arrangement is provided with a text data base 7 and a rule data base 8.

All important data required for describing and defining the process of the process equipment are stored in a memory member 9 of the process equipment 4. When installing a plant, i.e. when connecting the process equipment to the master system 1, a text file specific to the process equipment in question is entered into the text data base through a data storing medium, such as a floppy disc 10, and a configuration file also specific to the process equipment is entered into the rule data base. These files enable then a communication between the process equipment and the master through the second interface 5 by utilising a general process application protocol without any requirement that the master system 1 has any detail knowledge about the process equipment, but this is stored in the memory member 9 of the process equipment. The process equipment will in this way have access to the programming unit 3 of the master system 1, and an operator may through the programming unit 3 communicate with the process equipment and said different control parameters thereof. This is only done at the very installation and after that if any control parameter shall be modified at any time, for example due to new objects to be welded, which require other welding parameters, such as voltage, wire feed speed, gas mixture and the like. The robot is instead only actuated by pressing a start button so as to start the welding procedure, whereupon a given process is repeated until a stop button is pressed.

The superior equipment has also a process control member 11, which is connected to the transmitting member 6 for bi-directional communication therewith so as to obtain controlling of the process to be carried out by the process equipment, for example ensuring that the welding robot moves with the electrodes thereof to certain positions in certain movements and there carries out the welding thereof according to parameters set. Thus, the process control member causes synchronising of orders of measures from the external equipment 4 with movements of movable parts, such as robot arms, so that, when these come to a point in a path of movement, in which exchange of data, for example raising the voltage or the wire feed velocity, is to take place, the process control member 12 matches the path of movement and the orders to each other.

The superior arrangement has also a member 12 adapted to receive information received from the process equipment through the transmitting member 6 about particular events, such as faults in the process, so as to note and indicate such events.

When setting parameters through the programming unit a set of parameters stored in the memory member 9 is collected therefrom to a data region for an activated set of parameters, whereupon different parameters of the set of parameters may be modified and then used in a future process and possibly be stored in the memory member as a new set of parameters, which the plant has to have also when it is used the next time, through communication between the process equipment and the programming unit through the message interpreter 6 by means of the text data base and the rule data base. It is then important that the set of parameters stored in the memory member 9 contains parameters so chosen that it will be possible to use them in the process.

The texts needed for interactively setting parameters of the set of parameters for the specific equipment are stored in the text data base through said text file. Peculiarities of the particular process equipment are through said configuration file stored in the rule data base 8, which describes for example the following properties:

Which parameters are present in the set of parameters?

Which format has the parameter n? 1 byte, 2 bytes with signs, floating point number, choice from an amount of alternatives?

Which text from the text data base is to be used for the parameter n when the set of parameters is interactively set?

Which text from the text data base has the dimension of the parameter n?

Which alternatives are available for the none-numeric parameter n?

Through which text from the text data base shall a certain fault be reported?

How shall the fault be treated?

Shall the execution of the master arrangement 1 be stopped?

It is shown hereinafter how a configuration file and a text file associated therewith may look like in the case of a welding robot:

| Configuration file | Text file |
|---|---|
| GRAP PAR:<br>-parameter id         8<br>-parameter text id    8<br>-parameter unit       1<br>-value selection      0<br>-parameter dependency 0<br>-unit dependency      0<br>-transmission length  2 | 7:<br>Gas<br>8:<br>Voltage<br>9:<br>Wire feed speed<br>10:<br>Crater fill time |

GPAP PAR means parameters for general process application protocol (General Process Application Protocol).

It is also shown below how the data image on the programming unit 3 may look like when a given parameter is set, here the voltage, of the set of parameters. The allowed interval is indicated by maximum and minimum values.

| Modify | Voltage | | |
|---|---|---|---|
| Voltage | | 30.0 V | |
| Max | | 60.0 V | |
| Min | | 00.0 V | |
| Increase | Decrease | Cancel | OK |

A possible data image presented in the programming unit 3 at the interactive setting of parameters of a set of parameters is shown below, and the voltage may for example be extracted and modified according to the illustration in the preceding image.

TABLE NUMBER 3

================================ 3(8)=
| Method | Short/spray-arc |
|---|---|
| Material | AlSi |
| Gas | Ar2CO2 |
| Wire dimension | 1.0 mm |
| Crater fill | On |
| Voltage | 25.00 V |
| Wire feed speed | 300.00 cm/min |
| Crater fill time | 1.1 s |
| Cancel | OK |

It may be noted that it is the process equipment 4 itself that "owns the process" in the plant according to the invention and the superior arrangement 1, i.e. the master system of the robot, actually only knows through the operation of the programming unit 3 by the operator that now do I want to edit data, and the arrangement 1 tells the process equipment 4 that I want to edit the parameter set X, and the process equipment is driving the dialog from that moment, since it is this that knows which questions it wish to have an answer to. When the operator is then satisfied with the input, the process equipment 4 then drops the control and returns to be a slave, since it does not do anything on its own initiative.

Any process equipment may as already mentioned easily be connected to the master system 1 by entering text files and configuration files specific thereto into the text data base 7 and the rule data base 8, under the condition that this process equipment has data required stored in a memory member thereof and is prepared for communication through said second interface 5.

The invention is of course not in any way restricted to the preferred embodiment described above, but many possibilities to modifications thereof would be apparent to a man with ordinary skill in the art without departing from the basic idea of the invention, such as it is defined in the claims.

The invention claimed is:

1. A plant for interchangeably controlling process equipment adapted for carrying out process, comprising:
   a process equipment chosen from a group of process equipments, a memory member being arranged in the process equipment for storing data required for describing and defining a process specific to the chosen process equipment;
   a programming unit for receiving interpreted data pertaining to the process equipment and entering commands to set control parameters for the process; and
   a master system for communicating and interpreting data pertaining to the process equipment, the master system having:
      a first interface to the programming unit,
      a second interface to the process equipment, and
      a transmitting member interfaced to the first and second interface for transmitting information between the programming unit and the process equipment, the master system being provided with a rule data base and a text data base for communication between the process equipment and the programming unit, wherein said rule data base is adapted to receive a configuration file and said text data base is adapted to receive a text file from an external source, the files being specific to the process equipment chosen from the group of process equipments for configuring and controlling the process.

2. The plant according to claim 1, wherein the process equipment is adapted to enable access to said data through the programming unit.

3. A plant according to claim 1, wherein the master system communicates with process equipment through the second interface by utilizing a general process application protocol adapted to the format of said data in the memory member of the process equipment, the rule data base and the text data base being adapted to enable interpreting of data sent from the process equipment according to said application protocol by the transmitting member and transmitting therethrough to the programming unit, wherein said configuration file and text file are entered to these data bases through a data storing medium at an initial installation connection of the process equipment to the master system.

4. A plant according to claim 3, wherein said data storing medium is a floppy disc.

5. A plant according to claim 1, comprising a plurality of process equipments connected to the master system in common through a second interface.

6. A plant according to claim 1, wherein the process equipments are of at least two different types, and the rule data base and the text data base contain a particular configuration file and text file for each type of process equipment.

7. A plant according to claim 1, wherein the master system comprises a process controlling member connected to the transmitting member for bi-directional communication therewith so as to obtain control of the process to be carried out by the process equipment.

8. A plant according to claim 1, wherein the transmitting member is adapted to send information received from the process equipment about particular events, such as faults in the process, to a member included in the master system and adapted to note and indicate such events.

9. A plant according to claim 1, wherein the first interface comprises a man-machine interface (MMI=Man Machine Interface).

10. A plant according to claim 1, wherein said master system comprises a master system of a robot intended to carry out said process.

11. A plant according to claim 10, wherein the process equipment comprises welding equipment on a welding robot.

* * * * *